US008442285B2

(12) United States Patent
Madabhushi et al.

(10) Patent No.: US 8,442,285 B2
(45) Date of Patent: May 14, 2013

(54) COMBINED FEATURE ENSEMBLE MUTUAL INFORMATION IMAGE REGISTRATION

(75) Inventors: Anant Madabhushi, South Plainfield, NJ (US); Jonathan Chappelow, Belle Mead, NJ (US); Michael Feldman, Garnet Valley, PA (US); John E. Tomaszewski, Abington, PA (US)

(73) Assignees: The Trustees of The University of Pennsylvania, Philadelphia, PA (US); Rutgers, The State University of New Jersey, New Brunswick, NJ (US)

( * ) Notice: Subject to any disclaimer, the term of this patent is extended or adjusted under 35 U.S.C. 154(b) by 558 days.

(21) Appl. No.: 12/593,651

(22) PCT Filed: Apr. 1, 2008

(86) PCT No.: PCT/US2008/004218
§ 371 (c)(1),
(2), (4) Date: Mar. 2, 2010

(87) PCT Pub. No.: WO2008/123969
PCT Pub. Date: Oct. 16, 2008

(65) Prior Publication Data
US 2010/0177944 A1 Jul. 15, 2010

Related U.S. Application Data

(60) Provisional application No. 60/921,311, filed on Apr. 2, 2007.

(51) Int. Cl.
*G06K 9/00* (2006.01)
(52) U.S. Cl.
USPC .......................................................... 382/128
(58) Field of Classification Search .................. 382/128, 382/133, 160; 600/407, 410, 420
See application file for complete search history.

(56) References Cited

U.S. PATENT DOCUMENTS

| 6,154,560 | A | 11/2000 | Cothren et al. | |
| 2006/0018548 | A1 | 1/2006 | Chen et al. | |
| 2006/0039593 | A1* | 2/2006 | Sammak et al. | 382/133 |
| 2006/0245631 | A1 | 11/2006 | Levenson et al. | |
| 2006/0258933 | A1* | 11/2006 | Ellis et al. | 600/407 |
| 2006/0291728 | A1* | 12/2006 | Napoletani et al. | 382/224 |
| 2007/0165920 | A1 | 7/2007 | Gering et al. | |
| 2008/0056550 | A1 | 3/2008 | Kadir et al. | |

OTHER PUBLICATIONS

International Search Report for PCT International Application No. PCT/US08/04218 mailed Jul. 2, 2008.
Woods et al., Malignant-Lesion Segmentation Using 4 Co-Occurrence Texture Analysis applied to Dynamic Contrast-Enhanced Magnetic Resonance Breast Image Data', Journal of Magnetic Resonance Imaging, 25:495-501, 2007.

(Continued)

*Primary Examiner* — Michelle Le
(74) *Attorney, Agent, or Firm* — RatnerPrestia (57) ABSTRACT

This invention relates to medical image registration. Specifically, the invention relates to a combined feature ensemble mutual information (COFEMI) for robust inter-modal, inter-protocol image registration.

20 Claims, 3 Drawing Sheets

OTHER PUBLICATIONS

Bryan et al., "Ductal carcinoma in situ with basal-like phenotype: a possible precursor to invasive basal-like breast cancer", Modern Pathology, pp. 617-621, 2006.

M.R. Turner, "Texture Discrimination by Gabor Functions", Biol. Cybern. 55, 71-82, 1986.

Kapur et al., "Segmentation of brain tissue from magnetic resonance images", Medical Image Analysis, vol. 1, No. 2, pp. 109-127, 1996.

Yan et al., "Graph Embedding: A General Framework for Dimensionality Reduction", Proceedings of the 2005 IEEE Computer Society Conference on Computer Vision and Pattern Recognition, 2005.

Office Action for U.S. Appl. No. 12/867,349, filed Oct. 19, 2010, mailed Jan. 29, 2013.

* cited by examiner

Figure 1

(a) CMI, $I_2(A, BB'_1 \ldots B'_n)$ (b) SMI, $\sum_{i=1}^{n} I_2(A, B'_i)$

COMBINED FEATURE ENSEMBLE MUTUAL INFORMATION IMAGE REGISTRATION

This application is a U.S. National Phase Application of PCT International Application No. PCT/US2008/004218, filed Apr. 1, 2008, which claims benefit of priority from U.S. Provisional Application No. 60/921,311, filed Apr. 2, 2007. The contents of these applications are incorporated herein by reference.

FIELD OF INVENTION

This invention is directed to medical image registration. Specifically, the invention is directed to a combined feature ensemble mutual information (COFEMI) for robust inter-modal, inter-protocol image registration.

BACKGROUND OF THE INVENTION

Figure 1:
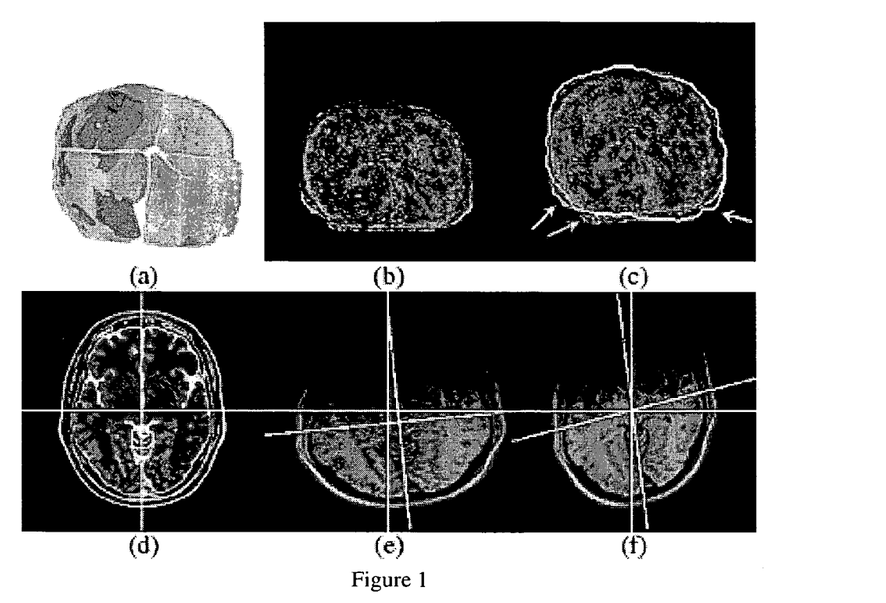
FIG. 1 shows registering (a) prostate whole mount histological section with corresponding (b) MRI section via conventional intensity-based MI results in (c) significant mis-registration (as indicated by arrows). Similar mis-registration errors (f) occur when intensity-based MI is applied to aligning (d) T2 with (e) T1 MRI images with significant image intensity artifacts (background inhomogeneity) and affine deformation added. Note the misalignment of the X,Y axes.

Registration of medical images is critical for several image analysis applications including computer-aided diagnosis (CAD), interactive cancer treatment planning, and monitoring of therapy progress. Mutual information (MI) is a popular image similarity metric for inter-modal and inter-protocol registration. Most MI-based registration techniques are based on the assumption that a consistent statistical relationship exists between the intensities of the two images being registered. Image intensity information alone however is often insufficient for robust registration. Hence if images A and B belong to different modalities (e.g. magnetic resonance imaging (MRI) and histology) or if B is degraded by imaging artifacts (e.g. background inhomogeneity in MRI or post-acoustic shadowing in ultrasound) then A and B may not share sufficient information with each other to facilitate registration by maximization of MI. Additional information not provided by image intensities of B is required. This may be obtained by transformation of B from intensity space to other feature spaces representations, $B'_1, B'_2, \ldots, B'_n$, that are not prone to the intensity artifacts of B and further explain structural details of A. FIG. 1(c) demonstrates a scenario where an ill-defined intensity based MI similarity metric results in imperfect alignment in registering a prostate histological section (1(a)) with the corresponding MRI section (1(b)). Conventional MI also results in misalignment (FIG. 1(f)) of a T2 MRI brain slice (1(d)) with a T1 MRI brain slice (1(e)) with simulated affine deformation and background inhomogeneity added.

Incorporating additional information to complement the MI metric for improved registration has been investigated previously. Image gradients, cooccurrence matrices, color channels, and connected component labels have all been considered for incorporation by use of weighted sums of MI of multiple image pairs, higher-order joint distributions and MI, and reformulations of MI. The utility of these techniques is constrained by (1) the limited in formation contained in a single arbitrarily chosen feature to complement image intensity and (2) the ad hoc formulations by which the information is incorporated into a similarity metric.

While one may argue that inhomogeneity correction and filtering methods may help overcome limitations of using intensity based MI techniques, it should be noted that these only offer partial solutions and conventional MI often cannot address vast structural differences between different modalities and protocols.

Accordingly, there is a need in the art for a reliable method capable of normalizing data from images taken in different modalities or protocols.

SUMMARY OF THE INVENTION

In one embodiment, provided herein is a registration method called combined feature ensemble mutual information (COFEMI) that maximizes the combined mutual information (CMI) shared by an intensity image A and multiple representations of another intensity image B in feature spaces $B'_1, B'_2, \ldots, B'_n$ that are less sensitive to the presence of artifacts and more robust to the differences between images of different modalities.

In another embodiment, the invention provides a method of registering images obtained by multiple modalities, comprising the steps of: obtaining a first intensity image; from the first intensity image, extracting multiple image features; from the multiple image features, determining an optimal feature ensemble; and using the optimal feature ensemble in a predetermined similarity metric, registering the first intensity image to another intensity image, wherein the first and second intensity images are obtained using different modalities.

In one embodiment, the invention provides a method of registering prostate images obtained by MRI and histology, comprising the steps of: obtaining a magnetic resonance image of a prostate; from the magnetic resonance image of a prostate, extracting multiple image features; from the multiple image features, determining an optimal feature ensemble; and using the optimal feature ensemble in a predetermined similarity metric, registering the magnetic resonance image of a prostate to a digitized histology image using combined mutual information and the feature ensemble.

Other features and advantages of the present invention will become apparent from the following detailed description examples and figures. It should be understood, however, that the detailed description and the specific examples while indicating preferred embodiments of the invention are given by way of illustration only, since various changes and modifications within the spirit and scope of the invention will become apparent to those skilled in the art from this detailed description.

BRIEF DESCRIPTION OF THE DRAWINGS

The invention will be better understood from a reading of the following detailed description taken in conjunction with the drawings in which like reference designators are used to designate like elements, and in which:

FIG. 3 shows prostate MRI slice shown in (b) is registered to (a) the corresponding histological section using (c) intensity-based MI and (f) COFEMI with (d) correlation and (e) gradient magnitude features. Brain (h) T1 MR is registered to (g) T2 MR using (i) MI and (l) CMI with (j) correlation and (k) inverse difference moment features. Green contours represent the boundary of the prostate histology (a) and brain T2

(g) overlaid onto the registered images (c), (i), (f), and (l). Red outlines accentuate the boundaries in the registration result. COFEMI improves registration of (f) multimodal and (l) multiprotocol images compared to original MI scheme.

DETAILED DESCRIPTION OF THE INVENTION

This invention relates in one embodiment to medical image registration. In another embodiment, the invention relates to a combined feature ensemble mutual information (COFEMI) for robust inter-modal, inter-protocol image registration.

In one embodiment, COFEMI methods described herein provide for the use of an optimal set of multiple image features to complement image intensity information and thus provide a more complete description of the images to be registered. In another embodiment, the methods described herein are analogous to pattern recognition methods in which combination of multiple features via ensemble (Decisions Trees, Support Vector Machines) often achieve greater classification accuracy than can be achieved by a single feature.

In order to register images A and B, the new COFEMI scheme described herein, first involves computing multiple feature images from an intensity image B using several image features, such as first and second order statistical and gradient calculations in certain embodiments. A subsequent feature selection step is used to next to obtain a set of uniquely informative features which are then combined using a novel MI formulation to drive the registration.

In one embodiment, the methods described herein provide the use of multiple image features derived from the original image to complement image intensity information, which helps overcome the limitations of conventional intensity-based MI schemes. In another embodiment, the methods described herein provide the use of a novel MI formulation which represents the combined (union) information that a set of implicitly registered images $(B'_1, B'_2, \ldots, B'_n)$ contains about another image A.

The method provided herein, quantitatively and qualitatively demonstrate the effectiveness of the techniques on a multimodal prostate study comprising both MRI and histology and a set of multiprotocol brain phantom images from the Brainweb simulated brain database. For both studies the COFEMI method delivers superior performance compared to the traditional intensity-based MI scheme. Also demonstrated is that the CMI formulation employed using the methods described herein, is more intuitively appropriate for combination of feature space information.

Accordingly and in another embodiment, provided herein is a method of registering images obtained by multiple modalities, comprising the steps of: obtaining a first intensity image; from the first intensity image, extracting multiple image features; from the multiple image features, determining an optimal feature ensemble; and using the optimal feature ensemble in a predetermined similarity metric, registering the first intensity image to another intensity image, wherein the first and second intensity images are obtained using different modalities.

When sets of image data are acquired by sampling the same scene at different times, from different perspectives, using different acquisition methods or focusing on different features of the scene, the resulting dataset will most likely be in different coordinate systems. The term "image registration" refers in one embodiment to the process of transforming the different sets of data into a single coordinate system. In another embodiment, image registration enables comparison or integration of the data obtained.

In one embodiment, the first intensity image, second intensity image or both, used in the methods described herein and are being registered to each other, is a natural image available in a digital format. In another embodiment, the natural image available in a digital format is an MR Image. In another embodiment, the natural image available in a digital format is a histology image. In another embodiment, the natural image available in a digital format is a CT image. In another embodiment, the natural image available in a digital format is a digitized x-ray. In another embodiment, the natural image available in a digital format is an ultrasound image.

In one embodiment, the feature extracted from the image datasets described herein and is computed and registered using the methods described herein, is an image feature. In another embodiment, the feature is a statistical gradient feature, or a Haralick co-occurrence feature in another embodiment, or a Gabor feature in yet another embodiment. Other features may be extracted according to the needs of the organ or tissue for which the registration is sought.

In another embodiment, the feature extracted in the methods and systems described herein is a statistical feature. In another embodiment, the feature extracted is a Haralick co-occurrence feature. In another embodiment, the feature extracted is a Haar wavelet feature. In another embodiment, the feature extracted is a Gabor feature. In another embodiment, the feature extracted is calculated independently from each channel of a digitized image using a sliding window of 3×3 pixels, or in another embodiment, from 5×5 pixels, or in another embodiment, from 7×7 pixels. In one embodiment, the Haralick co-occurrence feature, which is a statistic feature extracted in the methods and systems described herein, is an angular second moment. In another embodiment, the Haralick co-occurrence feature is a contrast. In another embodiment, the Haralick co-occurrence feature is a correlation. In another embodiment, the Haralick co-occurrence feature is a variance. In another embodiment, the Haralick co-occurrence feature is an entropy. In another embodiment, the Haralick co-occurrence feature is an inverse difference moment. In another embodiment, the Haralick co-occurrence feature is a sum average. In another embodiment, the Haralick co-occurrence feature is a sum variance. In another embodiment, the Haralick co-occurrence feature is a sum entropy. In another embodiment, the Haralick co-occurrence feature is a difference variance, or a difference entropy in another embodiment.

In one embodiment, the Haralick co-occurrence describes texture in terms of the statistical distribution of the grayscale pixel values within an image, such as in a grayscale of a histological image used in the methods and systems described herein. In the analysis, let $s_1=(x_1, y_1)$ and $s_2=(x_2, y_2)$ be two pixels in the image, and let $s_1$ and $s_2$ be separated by a displacement of $d=(d_x, d_y)$ pixels so that $s2=(T_2, y_2)=(T_1+d_x, y_1+d_y)=s_1+d(2.5)$ For a fixed displacement d, statistical methods assume that the probability that $s_1$ and $s_2$ take on grayscale values of i and j, respectively, is governed by the joint probability mass function (PMF) $P(i, j; d)$. It may equivalently reference the separation displacement between $s_1$ and $s_2$ by an absolute distance d and angle .theta. relative to the horizontal axis. The PMF of the spatial grayscale values becomes in this case $P(i, j; d, \theta)$.

Since the true grayscale distribution $P(i, j; d, \theta)$ is not known, it is estimated from empirical data. In another embodiment, Haralick accomplishes this with the so-called co-occurrence matrices. For an image I of size $N_x \times N_y$ with the set of distinct grayscale values $G=\{1, 2, \ldots, N_g\}$, Haralick's method creates symmetric co-occurrence matrices $P(i, j; d, \theta)$ with i, j $\in$G specifying grayscale values, $\theta \in \{0°, 45°, 90°,$ 135°} defining an angular direction and d representing the user-defined pixel distance. The (i, j) entry of P(i, j; d, θ) holds the total number of pixel pairs in the image, normalized by the total number of pixels in the image, with grayscale values i and j such that the two pixels in the pairs lie d pixels apart in the angular direction θ. [Robert M. Haralick, K. Shanmugam, and Its'Hak Dinstein. Textural features for image classification. IEEE Transactions on Systems, Man and Cybernetics, 3(6):610621, 1973]. Thus, for any specified d value, the method produces four co-occurrence matrices, one for each of the four θ values specified above. The value of d specifies the size of the neighborhood over which it is feasible to estimate the PMF of the grayscale distribution. In one embodiment, the resulting co-occurrence matrices serve as an estimate of the true grayscale distribution of the image.

The term "statistical gradient feature" refers in one embodiment to a-priori preselected substructures which are larger than a certain threshold value τ chosen based on their statistically significant sub-structures statistic. That statistic is in one embodiment an average. In another embodiment, the statistic is a median. In another embodiment, the statistic is a standard deviation. In another embodiment, the statistic is a difference. In another embodiment, the statistic is a Sobel filter. In another embodiment, the statistic is a Kirsch filter. In another embodiment, the statistic is a horizontal derivative. In another embodiment, the statistic is a vertical derivative. In another embodiment, the statistic is a diagonal derivative of a pre-selected determinant. In another embodiment, the statistic is a combination of factors.

In one embodiment, the Gabor feature is the result of convolving the image used in the methods and systems described herein, with a bank of Gabor filters, generated by convolving a Gaussian function with a sinusoid at a range of scale and orientation parameter values. In another embodiment, the Gabor filters used in the methods and systems described herein, is a linear filter whose impulse response is defined by a harmonic function multiplied by a Gaussian function. In another embodiment, because of the multiplication-convolution property, the Fouriers transform of a Gabor filter's impulse response is the convolution of the Fourier transform of the harmonic function and the Fourier transform of the Gaussian function. In one embodiment, the term "convolution" refers to a mathematical operator which takes two functions $f$ and $g$ and produces a third function that represents the amount of overlap between $f$ and a reversed and translated version of $g$. In another embodiment, convolution refers to a general moving average, by making one of the functions an indicator function of an interval.

In another embodiment, the step of computing determining an optimal feature ensemble done in the methods described herein is done using a standard ensemble method. In one embodiment, ensemble method refers to methods capable of producing bundled fits of data, by a stochastic algorithm, the output of which is some combination of a large number of passes through the dataset. Such methods are related in another embodiment, to iterative procedures in one embodiment and to bootstrap procedures in another. In one embodiment, the standard ensemble method is bagging. In another embodiment, the embodiment, the standard ensemble method is random forests. In another embodiment, the standard ensemble method is Adaboos, or their combination. in other discrete embodiment.

Bagging as used herein, refers in one embodiment to "bootstrap aggregation" and comprises an algorithm. In one embodiment, the following bagging ensemble algorithm is used in fitting a biological data set having n observations and a binary response variable;

1. Take a random sample of size n with replacement from the data.
2. Construct a classification tree as usual but do not prune.
3. Repeat steps 1-2 a large number of times.
4. For each case in the data set, count the number of times over trees that it is classified in one category and the number of times over trees it is classified in the other category
5. Assign each case to a category by a majority vote over the set of trees.

In another embodiment of bagging, additional operation is introduced. At each step, observations not included in the bootstrap sample (referred to as "out-of-bag" data) are "dropped" down the tree. A record is kept of the class to which each out-of-bag observation is assigned. This information is used in another embodiment, to compute a more appropriate measure of the classification error, because it derives from the data not used to build the tree.

In one embodiment, random trees, which, in another embodiment is the Adaboost classifier refers to the constructing a large number of trees from bootstrap samples of the intensity image data set. As each tree is constructed, a random sample of predictors is drawn before each class is split. For one embodiment, if there are ten predictor features, a random five predictors are chosen as candidates for defining the split. Then the best split is constructed, but selecting the features only from the five chosen. This process is repeated for each class. And, in one embodiment, as in bagging, no pruning is done. Thus, each tree is produced from of a random sample of scenes, and at each split a random sample of predictor features. Then classification is done by a majority vote of the full set of trees.

Mutual information (MI) is defined in one embodiment, in terms of Shannon entropy, a measure of information content of a random variable. Equation 1 gives the marginal entropy, S(A), of image A in terms of its graylevel probability distribution p(a), estimated by normalization of the gray level histogram of A, $$S(A) = -\sum_a p(a)\log p(a), \qquad \text{Equ. (1)}$$

where a represents the different gray levels in A. While marginal entropy of a single image describes the image's information content, the joint entropy S(A,B) of two images A and B (Equation 2) describes the information gained by combined knowledge of both images:

$$S(A, B) = -\sum_{a,b} p(a, b)\log p(a, b), \qquad \text{Equ. (2)}$$

Thus, when image A best explains image B, joint entropy is minimized to max {S(A), S(B)}. Equation 3 is a formulation of MI in terms of the marginal and joint entropies wherein the MI of a pair of images or random variables, $I_2(A,B)$, is maximized by minimizing joint entropy S(AB) and maintaining the marginal entropies S(A) and S(B). AB represents simultaneous knowledge of both images.

$$I_2(A,B)=S(A)+S(B)-S(A,B) \qquad \text{Equ. (3)}$$

Hence $I_2(A,B)$ describes the interdependence of multiple variables, or graylevels of a set of images. Thus, when $I_2(A,B)$ increases, the uncertainty about A given B decreases. Hence it is assumed that the global MI maximum will occur at the point of precise registration, when all uncertainty about A is completely explained by B. Generalized (higher-order) MI, which calculates the intersecting information of multiple variables, is neither a measure of the union of information nor a nonnegative quantity with a clear interpretation. Surprisingly, the formulation has still been used in many feature driven registration tasks.

In one embodiment, the predetermined similarity metric used in the step of registering the first intensity image to another intensity image used in the methods of registering multimodal intensity images as described herein, is a combined mutual information formulation represented by Equation 4.

The combined mutual information (CMI) that a set of two semi-independent images, B and $B'_j$, contain about a third image, A, is defined by the equation $I_2(A,BB'_j)=S(A)+S(BB'_j)-S(ABB'_j)$. This formulation allows the incorporation of unique (non-redundant) information provided by an additional image, B', about A. Hence, the generalized form of CMI is:

$$I_2(A,BB'_1B'_2\ldots B'_n)=S(A)+S(BB'_1B'_2\ldots B'_n)-S(A,BB'_1B'_2\ldots B'_n)$$ Equation 4

Figure 2:
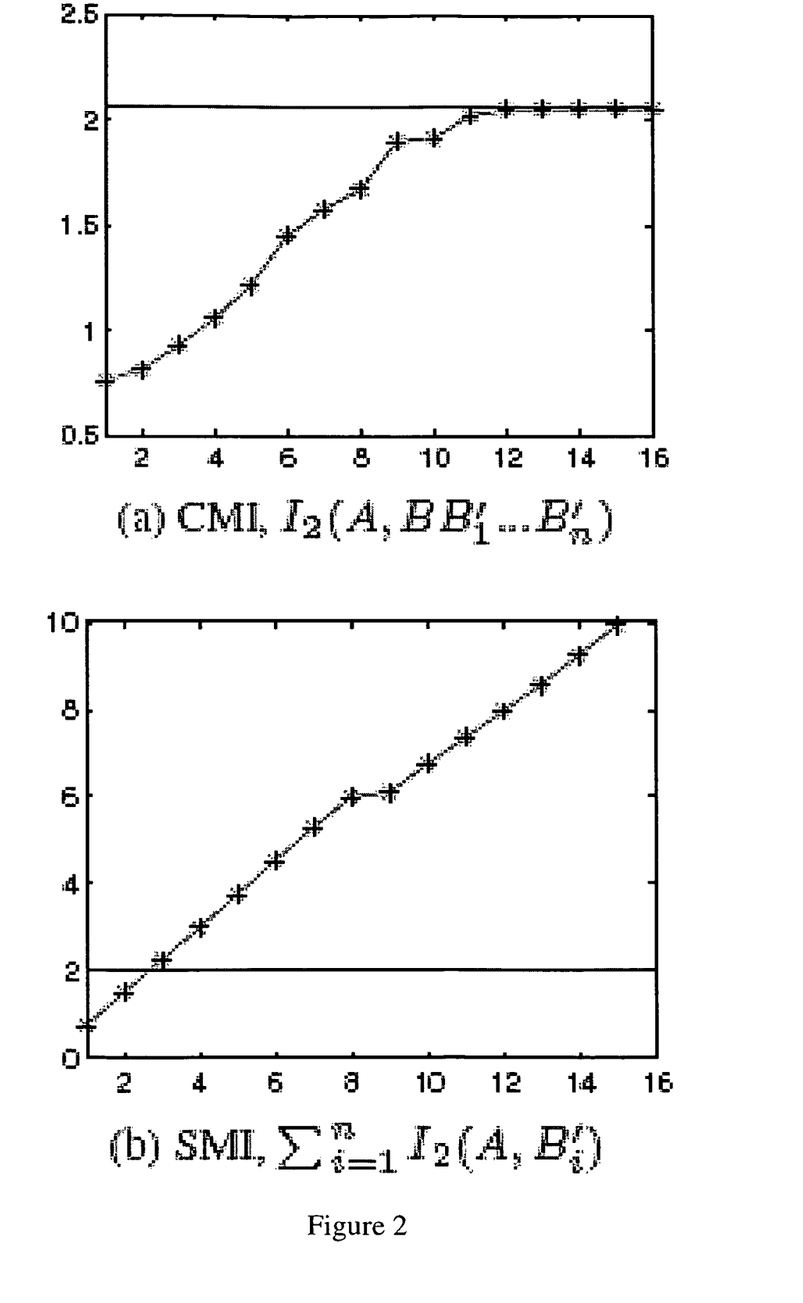
FIG. 2 shows behavior of CMI for n feature images (a) demonstrates that CMI is bounded by S(A) (horizontal line), the information content of A. Summation of MI (SMI) of A and n features combines redundant information about A and is not bound by S(A). The upper bound on the value of CMI suggests that it is a more intuitive formulation for combining MI from n sources compared to SMI.

$B'_1, B'_2, \ldots, B'_n$ is referred to in one embodiment, as an ensemble. CMI incorporates only the unique information of additional images, thus enhancing but not overweighting the similarity metric with redundant information. Therefore, it is always the case that $I_2(B'_1, B'_2, \ldots, B'_n) \leq S(A) = I_2(A,A)$. The rationale behind using CMI is that one or more of the feature images $B'_1, B'_2, \ldots, B'_n$ of intensity image B will not be plagued to the same extent by intensity artifacts as B and will provide additional structural description of A. FIG. 2 illustrates the properties of CMI in comparison to summation of MI (SMI) of image pairs $(A,B'_1), \ldots, (A,B'_n)$. As $B'_1, B'_2, \ldots, B'_n$ are introduced, CMI approaches an asymptote (FIG. 2a) equal to S(A), the total information content of A. On the other hand, SMI (FIG. 2b) increased in an unbounded fashion as intersecting information between the image pairs is recounted. Despite the ambiguous meaning of the quantity measured by SMI, weighted summation of MI and related quantities (entropy correlation coefficient) is still used in feature-enhanced registration studies. The plots in FIG. 2 shows clearly that CMI is a more appropriate measure of information gained from a set of implicitly registered images than weighted summation of MI or higher order MI.

In one embodiment, the step of registering the first intensity image using the methods described herein further comprises the step of optimizing an affine transformation parameter. In another embodiment, the term "affine transformation" is used for comprehensively refer to a geometrical coordinate transformation including rotation, movement, enlargement and reduction of images. In another embodiment, "affine transform" of a plane preserves collinearity under the operations of translation, rotation, scaling, shearing, and reflection such that straight lines are mapped into straight lines and parallel lines into parallel lines.

In another embodiment, the methods described hereinabove, are used for registering tissue or organ images, such as a prostate, pancreas, ovary, stomach brain and the like. In one embodiment, provided herein is a method of registering prostate images obtained by MRI and histology, comprising the steps of: obtaining a magnetic resonance image of a prostate; from the magnetic resonance image of a prostate, extracting multiple image features; from the multiple image features, determining an optimal feature ensemble; and using the optimal feature ensemble in a predetermined similarity metric, registering the magnetic resonance image of a prostate to a digitized histology image using combined mutual information and the feature ensemble.

In one embodiment, the magnetic resonance image used as an embodiment of an intensity image of a prostate used in the methods described herein, which is registered in another embodiment to another intensity image obtained using another modality, is corrected for background inhomogeneity. The image inhomogeneity or IIH (also termed as the intensity nonuniformity, the bias field, or the gain field in other embodiments) refers in one embodiment to the slow, nonanatomic intensity variations of the same tissue over the image domain. It can be due to imaging instrumentation (such as radio-frequency nonuniformity, static field inhomogeneity, etc.) in one embodiment or the patient movement in another embodiment. In certain circumstances, the presence of IIH significantly reduces the accuracy of image segmentation and registration, hence decreasing the reliability of subsequent quantitative measurement. Image intensity standardization is in one embodiment, a procedure for correcting acquisition-to-acquisition signal intensity variations (nonstandardness) inherent in magnetic resonance (MR) images. Inhomogeneity correction refers in another embodiment, to a process used to suppress the low frequency background nonuniformities (inhomogeneities) of the image domain that exist in MR images. In another embodiment, if a map of the IIH in the image domain is known or can be estimated, then correcting the IIH is done by division in, or subtraction in the log-domain. In one embodiment, estimating the IIH map in the image domain is done using lowpass filtering in one embodiment, or surface fitting statistical modeling, comparison between local and global statistics, image feature-based methods, or pure estimation in other discrete embodiments.

In one embodiment, the methods described herein provide a new MI based registration scheme called COFEMI that integrates the combined descriptive power of multiple feature images for both inter-modal and inter-protocol image registration. An ensemble of feature images derived from the source intensity image are used in certain embodiments, for the construction of a similarity metric that is robust to non-ideal registration tasks. By using multiple feature representations of the original image in another embodiment, COFEMI is able to overcome the limitations of using conventional intensity-based MI registration by providing additional information regarding the images to be registered. The novel methods provided herein, allow in one embodiment to optimally select a subset of informative features for use with COFEMI, which makes limited assumptions about the formulation of the features. Accordingly, in one embodiment the set of features extracted from the intensity images used in the methods described herein, are optimized for the tissue or organ sought to be registered and the modality of the intensity image to which the optimized ensemble feature scene is to be registered.

The prostate MR images shown in Example 1 described herein had been previously corrected for inhomogeneity and yet, as shown in Table I, conventional MI was only marginal successful. The COFEMI registration technique is shown to qualitatively and quantitatively improve registration accuracy over intensity-based MI on multimodal prostate histology-MR and multiprotocol synthetic brain MR data sets. While in one embodiment the methods described herein use affine registration, in another embodiment, COFEMI is used to precede elastic registration or applied to elastic registration routines in yet another embodiment, which utilize similarity metrics or cost functions.

The following examples are presented in order to more fully illustrate the preferred embodiments of the invention. They should in no way be construed, however, as limiting the broad scope of the invention.

EXAMPLES

Materials and Methods

Feature Extraction

For a template image, A, to which another image, B, is to be registered, a total of 471 different feature images were calculated from B. As described hereinabove, these feature images $B'_1, B'_2, \ldots, B'_n$ comprise (i) gradient, (ii) first order statistical, and (iii) second order statistical features. Feature image $B'_j$ where $j \ni \{1, \ldots, n\}$ is generated by calculating the feature value corresponding to feature $\Phi_j$ from the local neighborhood around each pixel in B. An optimal set of features represent higher-order structural representations of the source intensity image B, some of which are not prone to the artifacts of B and most of which contain additional MI with A.

From n feature images, an ensemble of k images is defined as $\pi^{k,l} = B'_{\alpha 1} B'_{\alpha 2} \ldots B'_{\alpha k}$ for $\alpha_1, \alpha_2, \ldots, \alpha_k\} \ni \{1, \ldots, n\}$ where $\ni \{1, \ldots, \binom{n}{k}\}$. Note that a total of $\binom{n}{k}$ ensembles of size k can be determined from $B'_1, B'_2, \ldots, B'_n$. In one embodiment, the feature ensemble chosen for CMI-based registration provides maximal additional information from B to predict A. Thus, the optimal ensemble determined by arg $\max_{k,l}\{S(B\pi^{k,l})\}$ corresponds to $\pi^{n,l}$, the ensemble of all n features. Since it is not practical to estimate the joint graylevel distribution for n images, $\pi^{k,l}$ must be considered for k<n, however even for k=6, a brute force approach to determining optimal $\pi^{k,l}$ would not be practical. Consequently the following algorithm is provided to select the optimal feature ensemble, which is referred to as π. In practice, since using more than 5 features causes the gray level histogram to become too dispersed to provide a meaningful joint entropy estimate, a constraint of k=5 is imposed. Since even second order entropy calculations are known to be overestimated, a bin size of 16 was used for higher order histograms so that joint entropy estimates remain informative in a similarity metric.

TABLE

Algorithm CMIfeatures

Input: B, k, $B'_1, \ldots, B'_n$.
Output: $\pi^k$.
begin
    0. Initialize $\pi^k$, Ω, as empty queues;
    1. for u = 1 to k
    2.   for v = 1 to n
    3.     If $B'_v$ is present then
    3.       Insert $B'_v$ into $\pi^k$, Ω[v] = $S(B\pi^k)$;
    4.       Remove $B'_v$ from $\pi^k$;
    5.     endif;
    5.   endfor;
    6.   m = argmax Ω[v]; Insert $B'_m$ into $\pi^k$;
    7. endfor;
end COFEMI-Based Image Registration After determining the optimal feature ensemble associated with B, π is used to register intensity images A and B via the CMI similarity metric (See e.g. Equation 4). Correct alignment is achieved by optimizing an affine transformation by maximization of CMI of A with π and B, $I_2(A, B\pi)$. The registered target image, $B^r$, is calculated by transforming B with the determined affine deformation. A Nedler-Mead simplex algorithm is used to optimize affine transformation parameters for rotation, translation and scaling. For evaluation purposes, intensity-based MI registration is implemented using both nearest neighbor (NN) and linear (LI) interpolation and 128 graylevel bins. CMI-based registration uses NN interpolation and 16 graylevel bins.

Example 1

Use of COFEMI to Register Prostate Images Obtained by MRI and Histology

The method provided herein, quantitatively and qualitatively demonstrate the effectiveness of the technique on a multimodal prostate study comprising both MRI and histology and a set of multiprotocol brain phantom images from the Brainweb simulated brain database. For both studies the COFEMI method delivers superior performance compared to the traditional intensity-based MI scheme. Also demonstrated is that the CMI formulation employed using the methods described herein, is more intuitively appropriate for combination of feature space information.

Figure 3:
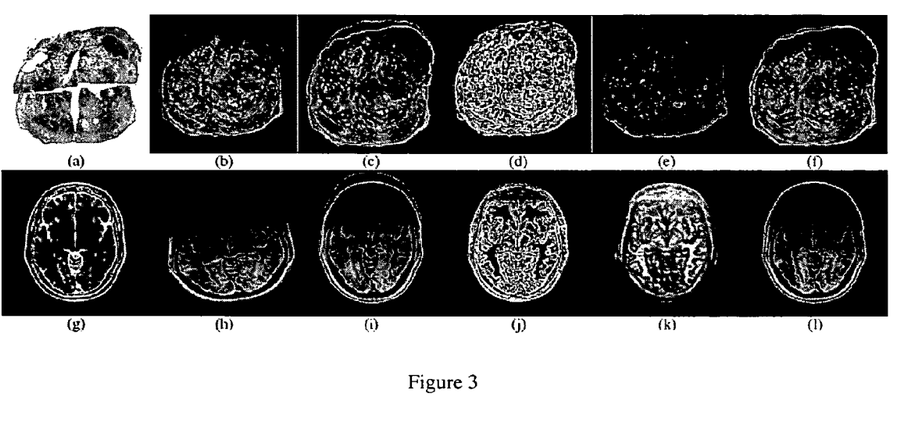

For purposes of evaluation, a mutlimodal prostate data set and a synthetic multiprotocol brain data set were used. The prostate data set is composed of 17 corresponding 4 Tesla ex vivo MR and digitized histology images, of which the MR is chosen as the target (B) for the alignment transformations and the histology as the template (A) to which the target is aligned. The dimension of the MR prostate volume is 256× 256×64 with voxel size of 0.16 mm×0.16 mm×0.8 mm. The MR images have been previously corrected for background inhomogeneity. Slicing and sectioning of the prostate specimen to generate the histology results in deformations and tissue loss, which can be seen in FIG. 3(a) where the slice was cut into quarters for imaging. The Brainweb data comprised corresponding T1 and T2 MR brain volumes of dimensions 181×217×181 with voxel size of 1 mm³. Inhomogeneity artifact on the T1 brain MR data is simulated with a cubic intensity weighting function. A known affine transformation comprising rotation in the x-y plane ($\hat{\theta}$=5.73 degrees), translation ($\hat{\Delta}_x$=−8 pixels, $\hat{\Delta}y$=−15 pixels) and scaling ($\hat{\psi}x$=0.770, $\hat{\psi}y$=1.124) was applied to the T1 images.

RESULTS

Qualitative Evaluation

The conventional MI metric results in a clear misalignment for registration of prostate MR with histology, as can be seen on the slice in FIG. 3(c), by the overlaid histology boundary in green that cuts through the top of the gland instead of along the MR prostate boundary in red. The COFEMI registration results (FIG. 3(f)) in a more accurate alignment of the prostate MR to histology using an ensemble of four features (k=4) including Haralick correlation (3(d)) and gradient magnitude (3(e)). Registration of the T1 and T2 brain phantoms (FIG. 3(g) and (h)) using intensity-based MI also results in misregistration (FIG. 3(i)) as a result of the simulated inhomogeneity and the known affine transformation applied to the original T1 image. Incorporating an ensemble of T1 feature images including correlation (FIG. 3(j)) and inverse difference moment (3(k)) using COFEMI, registration results are greatly improved (3(l)). A high order joint histogram with at most 32 graylevels is necessary to provide a minimally dispersed histogram appropriate for registration. Over all 17 prostate slice pairs registered, intensity-based MI and single feature CMI were found to be more susceptible to misregistration than COFEMI, as were CMI using the gradient image only or randomly chosen features.

Quantitative Evaluation

Quantitative evaluation of COFEMI on the brain phantom MRI images (FIG. 3) was performed. The registration result, $B^r$, using COFEMI was compared against the T1 image before application of the affine transformation and the residual relative percent errors ($\epsilon_\theta$, $\epsilon_{\Delta x}$, $\epsilon_{\Delta y}$, $\epsilon_{\psi x}$, $\epsilon_{\psi y}$) in correcting for the known deformation $\theta$, $\Delta_x$, $\Delta_y$, $\psi_z$, $\psi_y$). In table 1 the relative percentage errors in translation, rotation, and scaling is reported using conventional MI with NN interpolation ($MI^{NN}$) and LI interpolation ($MI^{LI}$).

TABLE 1

Affine transformation parameter percent errors for registration of synthetic brain MRI are presented for MI (NN and LI interpolation) and COFEMI (feature ensembles $\pi_1, \pi_2, \pi_3, \pi_4$)

| Metric | $\epsilon_\theta$ | $\epsilon_{\Delta x}$ | $\epsilon_{\Delta y}$ | $\epsilon_{\psi x}$ | $\epsilon_{\psi y}$ |
|---|---|---|---|---|---|
| $MI^{NN}$ | 181 | 18.15 | 9.36 | 1.55 | 0.09 |
| $MI^{LI}$ | 25.85 | 6.70 | 68.40 | 2.45 | 9.50 |
| $COFEMI^{\pi 1}$ | 4.28 | 8.89 | 1.73 | 0.22 | 0.56 |
| $COFEMI^{\pi 2}$ | 0.29 | 0.26 | 0.13 | 0.13 | 0.03 |
| $COFEMI^{\pi 3}$ | 0.06 | 0.37 | 0.33 | 0.07 | 0.08 |
| $COFEMI^{\pi 4}$ | 0.18 | 0.16 | 0.31 | 0.08 | 0.07 |

COFEMI is reported for 4 different ensembles ($COFEMI^{\pi 1}$-$COFEMI^{\pi 4}$) comprising between 2 to 4 features taken from within $\pi^k$ as selected by CMIfeatures (correlation, inverse difference moment, gradient, mean, sum average, median). Each value of ($\epsilon_\theta$, $\epsilon_{\Delta x}$, $\epsilon_{\Delta y}$, $\epsilon_{\psi x}$ and $\epsilon_{\psi y}$ for $COFEMI^{\pi 1}$-$COFEMI^{\pi 4}$ is smaller than the comparable results obtained using $MI^{NN}$ and $MI^{LI}$.

Having described preferred embodiments of the invention with reference to the accompanying drawings, it is to be understood that the invention is not limited to the precise embodiments, and that various changes and modifications may be effected therein by those skilled in the art without departing from the scope or spirit of the invention as defined in the appended claims.

What is claimed is:

1. A method of registering images obtained by multiple modalities, comprising the steps of:
   obtaining a first intensity image representing bodily tissue or a bodily organ;
   obtaining a second intensity image representing the bodily tissue or bodily organ, the second intensity image being obtained using a different modality than the first intensity image;
   from the first intensity image, extracting multiple feature images wherein each feature image includes a plurality of pixels corresponding to the plurality of pixels in the first intensity image and each feature image represents a respectively different feature derived from the first intensity image;
   from the multiple feature images, determining, using a computer, an optimal feature image ensemble by determining a set of feature images selected from the multiple feature images that provide a greatest amount of information about the first intensity image; and
   using the optimal feature image ensemble in a predetermined similarity metric, registering, using the computer, the first intensity image to the second intensity image.

2. The method of claim 1, whereby the first intensity image is a natural image available in a digital format.

3. The method of claim 2, whereby the natural image available in a digital format is an MR Image, a histology image, a CT image, a digitized x-ray, or an ultrasound image.

4. The method of claim 1, whereby the extracted feature images include first order statistical features, Haralick co-occurrence features, gradient feature images, Gabor feature images or their combination.

5. The method of claim 4, whereby said gradient feature images include horizontal derivatives, vertical derivatives, diagonal derivatives of a pre-selected determinant or their combination.

6. The method of claim 4, whereby said Haralick co-occurrence feature image is an angular second moment, a contrast, a correlation, a variance, an entropy, an inverse difference moment, a sum average, a sum variance, a sum entropy, a difference variance, or a difference entropy derived from the spatial gray level co-occurrence matrix.

7. The method of claim 3, whereby said Gabor feature image is the result of convolving said image with a bank of Gabor filters, generated by convolving a Gaussian function with a sinusoid at a range of scale and orientation parameter values.

8. The method of claim 1, whereby the step of determining an optimal feature image ensemble is done using a standard ensemble method.

9. The method of claim 8, whereby the standard ensemble method is bagging, random forests, Adaboost or their combination.

10. The method of claim 1, whereby the predetermined similarity metric is a combined mutual information formulation represented by Equation 4.

11. The method of claim 1, whereby the step of registering the first intensity image further comprises the step of optimizing an affine transformation parameter.

12. The method of claim 11, whereby the affine transformation parameter is rotation, translation, scaling or their combination.

13. A method of registering prostate images obtained by MRI and histology, comprising the steps of:
   obtaining a magnetic resonance image of a prostate;
   obtaining a digitized histology image of the prostate;
   from the magnetic resonance image of a prostate, extracting multiple feature images wherein each feature image includes a plurality of pixels corresponding to the plurality of pixels in the magnetic resonance image and each feature image represents a respectively different feature derived from the magnetic resonance image;
   from the multiple feature images, determining, using a computer, an optimal feature image ensemble by determining a set of feature images selected from the multiple feature images that provide a greatest amount of information about the magnetic resonance image; and
   using the optimal feature image ensemble in a predetermined similarity metric, registering, using a computer, the magnetic resonance image of the prostate to the digitized histology image using combined mutual information and the feature image ensemble.

14. The method of claim 13, whereby the extracted feature images include first order statistical feature images, Haralick co-occurrence feature images, gradient feature images, Gabor feature images or their combination.

15. The method of claim 13, whereby the magnetic resonance image of a prostate is corrected for background inhomogeneity.

16. The method of claim 13, whereby the step of determining the optimal feature image ensemble is done using a standard ensemble method.

17. The method of claim 16, whereby the standard ensemble method is bagging, random forests, or their combination, Adaboost.

18. The method of claim 13, whereby the predetermined similarity metric is a combined mutual information formulation represented by Equation 4.

19. The method of claim 13, whereby the step of registering the first intensity image further comprises the step of optimizing an affine transformation parameter.

20. The method of claim 19, whereby the affine transformation parameter is rotation, translation, scaling or their combination.

* * * * *

UNITED STATES PATENT AND TRADEMARK OFFICE
CERTIFICATE OF CORRECTION

PATENT NO.        : 8,442,285 B2
APPLICATION NO.   : 12/593651
DATED             : May 14, 2013
INVENTOR(S)       : Madabhushi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 709 days.

Signed and Sealed this
Eighth Day of September, 2015

Michelle K. Lee
*Director of the United States Patent and Trademark Office*